US009332555B2

(12) United States Patent
Sartori et al.

(10) Patent No.: US 9,332,555 B2
(45) Date of Patent: May 3, 2016

(54) SYSTEM AND METHOD FOR DIRECT MOBILE COMMUNICATION

(71) Applicant: FutureWei Technologies, Inc., Plano, TX (US)

(72) Inventors: Philippe Sartori, Plainfield, IL (US); Deping Liu, Schaumburg, IL (US); Vipul Desai, Palatine, IL (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 87 days.

(21) Appl. No.: 14/214,729

(22) Filed: Mar. 15, 2014

(65) Prior Publication Data

US 2014/0269392 A1    Sep. 18, 2014

Related U.S. Application Data

(60) Provisional application No. 61/931,316, filed on Jan. 24, 2014, provisional application No. 61/794,903, filed on Mar. 15, 2013.

(51) Int. Cl.
*H04W 72/08* (2009.01)
*H04W 72/04* (2009.01)

(52) U.S. Cl.
CPC ........ *H04W 72/082* (2013.01); *H04W 72/0406* (2013.01)

(58) Field of Classification Search
None
See application file for complete search history.

(56) References Cited

U.S. PATENT DOCUMENTS

| 2010/0311349 | A1  | 12/2010 | Koo et al. |
| 2011/0098043 | A1* | 4/2011  | Yu et al. .................... 455/435.1 |
| 2011/0258327 | A1* | 10/2011 | Phan et al. .................... 709/227 |
| 2012/0106517 | A1* | 5/2012  | Charbit et al. ................ 370/336 |
| 2012/0129540 | A1* | 5/2012  | Hakola et al. ................. 455/450 |
| 2012/0163235 | A1  | 6/2012  | Ho et al. |
| 2013/0059583 | A1* | 3/2013  | Van Phan et al. ......... 455/435.1 |
| 2013/0223353 | A1  | 8/2013  | Liu et al. |

(Continued)

FOREIGN PATENT DOCUMENTS

| WO | 2011109027 A1 | 9/2011 |
| WO | 2012083973 A1 | 6/2012 |

(Continued)

OTHER PUBLICATIONS

International Search Report received in Application No. PCT/US2014/029928, mailed Aug. 15, 2014, 11 pages.

(Continued)

*Primary Examiner* — Benjamin H Elliott, IV
(74) *Attorney, Agent, or Firm* — Slater & Matsil, L.L.P.

(57) ABSTRACT

Embodiments are provided reducing interference between cellular and direct mobile communication (DMC) links in wireless systems. In embodiment, a method performed by a network controller includes sending, to a second network controller, information of resources for a first set of DMC links between DMC user equipments (UEs). The first set of DMC links is associated with the network controller. The method further includes receiving second information of resources for a second set of DMC links associated with the second network controller. The network controller coordinates with the second network controller the allocation of network resources for the first set of DMC links between the DMC UEs. The network resources comprise cellular and DMC resources.

20 Claims, 3 Drawing Sheets

(56) References Cited

U.S. PATENT DOCUMENTS

| | | | |
|---|---|---|---|
| 2013/0258996 A1* | 10/2013 | Jung et al. | 370/330 |
| 2013/0287012 A1* | 10/2013 | Pragada | H04W 76/045 370/338 |
| 2013/0322277 A1* | 12/2013 | Vanganuru | H04W 24/08 370/252 |
| 2013/0322388 A1* | 12/2013 | Ahn | H04W 76/023 370/329 |
| 2014/0038653 A1* | 2/2014 | Mildh et al. | 455/501 |
| 2014/0185529 A1* | 7/2014 | Lim | H04W 76/023 370/328 |
| 2014/0269392 A1* | 9/2014 | Sartori et al. | 370/252 |

FOREIGN PATENT DOCUMENTS

| | | |
|---|---|---|
| WO | 2012085620 A1 | 6/2012 |
| WO | 2012144941 A1 | 10/2012 |

OTHER PUBLICATIONS

"3rd Generation Partnership Project; Technical Specification Group Radio Access Network; Evolved Universal Terrestrial Radio Access (E-UTRA); Physical Channels and Modulation Physical Channels and Modulation; (Release 11)," 3GPP TS 36.211, V11.3.0, Jun. 2013, 108 pages.

"3rd Generation Partnership Project; Technical Specification Group Radio Access Network; Evolved Universal Terrestrial Radio Access (E-UTRA); Physical layer procedures (Release 11)," 3GPP TS 36.213, V11.3.0, Jun. 2013, 173 pages.

"LTE; Evolved Universal Terrestrial Radio Access (E-UTRA) and Evolved Universal Terrestrial Radio Access Network (E-UTRAN); Overall description; Stage 2," (3GPP TS 36.300, V9.1.0, Release 9), Oct. 2009, 169 pages.

* cited by examiner

SYSTEM AND METHOD FOR DIRECT MOBILE COMMUNICATION

This application claims the benefit of U.S. Provisional Application No. 61/794,903 filed on Mar. 15, 2013 by Philippe Sartori et al. and entitled "Interference-Reduction for DMC Transmission," and the benefit of U.S. Provisional Application No. 61/931,316 filed on Jan. 24, 2014 by Philippe Sartori et al. and entitled "System and Method for Direct Mobile Communication," which are hereby incorporated herein by reference as if reproduced in their entirety.

TECHNICAL FIELD

The present invention relates to the field of wireless communications, and, in particular embodiments, to a system and method for direct mobile communication (DMC).

BACKGROUND

In wireless communications, there has been increasing demand for direct device-to-device communication (D2D) and direct mobile communication (DMC). Both D2D and DMC refer to a communication mode between a group of user equipments (UEs) that does not include or does not always include a communications controller in a communication data path between or among the UEs. DMC is used herein to denote this form of communications. Generally, a DMC link involves direct communications between a group of DMC devices occurring as point-to-point communications, either as point-to-single-point, or as point-to-multipoint, without having the data passing through and being fully controlled by a communications controller, such as an evolved NodeB (eNB), a NodeB, a base station, any other network controller. A DMC entity can be a UE, a mobile station, a mobile, a communications device, a subscriber, or a terminal. A DMC link is different than a cellular link. A cellular link between UEs involves data shared between the UEs and data communication path passed through a network infrastructure node such as an eNB, relay node, or the like. On the other hand, while control information for a DMC link can transit through a network node (e.g., an eNB or a relay), the data is directly exchanged between the UEs. DMC thus can enable a cellular network to offload a portion of its base station traffic. DMC and cellular links can interfere with each other. This interference affects the performance of the cellular network. There is a need for a method to control interference.

SUMMARY OF THE INVENTION

In accordance with an embodiment, a method performed by a network controller includes sending, to a second network controller, information of resources for a first set of direct mobile communication (DMC) links between DMC user equipments (UEs). The first set of DMC links is associated with the network controller. The method further includes receiving second information of resources for a second set of DMC links associated with the second network controller.

In accordance with another embodiment, a method performed by a network component for allocating resource allocation for DMC in a network includes allocating network resources for DMC UEs and cellular UEs associated with the network component. The allocation includes determining the network resources for the DMC UEs according to a parameter associated with the network component. The method further includes sending, to a second network component, information about the DMC UEs and the network resources.

In accordance with another embodiment, a network component comprising at least one processor and a non-transitory computer readable storage medium storing programming for execution by the at least one processor. The programming includes instructions to send, to a second network controller, information of resources for a first set of DMC links between DMC UEs. The first set of DMC links is associated with the network controller. The programming includes further instructions to receive second information of resources for a second set of DMC links associated with the second network controller.

In accordance with yet another embodiment, a network component comprising at least one processor and a non-transitory computer readable storage medium storing programming for execution by the at least one processor. The programming includes instructions to send, to a second network controller, information of resources for a first set of DMC links between DMC UEs. The first set of DMC links is associated with the network controller. The programming includes further instructions to receive second information of resources for a second set of DMC links associated with the second network controller.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

DMC enables a cellular network to offload traffic to a wireless communication path without or with limited involvement of a communications controller, e.g., a base station, in the communication link between UEs. DMC can also enable easy data transfers to and from diverse peripheral devices such as printers, cameras, personal computers, television receivers, and the like, which are co-located in the physical environment of the end user. For example, devices within a radius (e.g., a distance of 50 meters) or acceptable physical measures (e.g., power levels) of the end user can be considered co-located. In some scenarios, cellular operators generally desire to have DMC under their control for purposes of billing and accounting, management of carrier frequencies and interference, and/or overall management of network traffic load to optimize available bandwidths.

Figure 1:
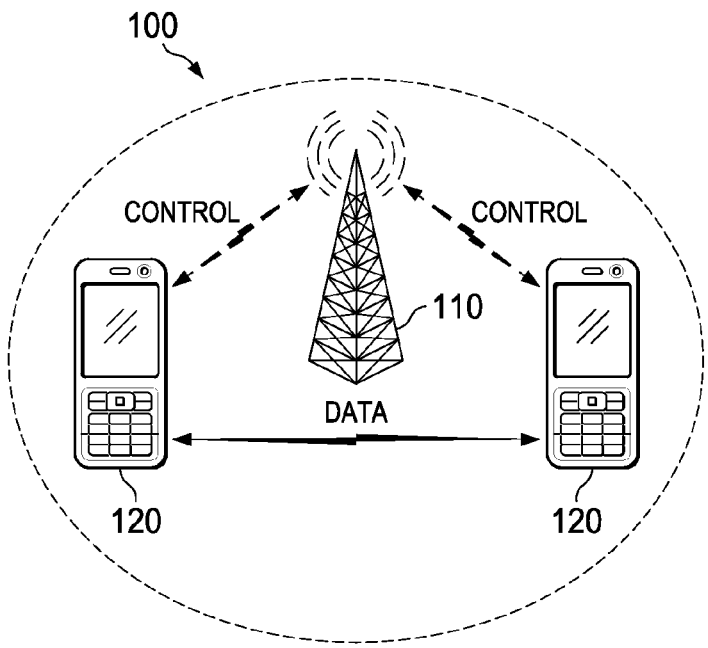
FIG. 1 is a block diagram of a system using direct mobile communication (DMC)

Although the term DMC can refer to a communication mode between UEs without a communications controller in a communication path between the UEs, the term DMC is extended herein to any group of communicating devices that do not need to include communications with a cellular base station in the data path. FIG. 1 shows a system 100 using DMC. The system 100 includes a communications controller 110, e.g., an eNB, communicating in a cellular link with a group of UEs 120. The UEs 120 can also communicate with each other directly over a DMC link. The group of UEs 120 comprises two or more UEs 120. The eNB or controller 110 communicates control information with the UEs 120 over uplink/downlink wireless communication links. The UEs 120 directly communicate data with each other over the DMC link. The control transits for the DMC link transits through the eNB or controller 110. In other embodiments, the control may be transmitted directly between the two UEs 120 without going through the eNB.

A DMC data link is a direct communication link between two or more UEs with limited or without much involvement of network functionality, such as by a communications controller, for the communication link between the two UEs. Generally, there are two ways of implementing DMC: device-centric and network-centric. In a device-centric arrangement, devices initiate a DMC connection without network oversight. In a network-centric arrangement, the network initiates the DMC connection between a group of UEs (DMC UEs) when conditions are appropriate and assists the DMC UEs to communicate with each other over a DMC link, for example, by transmitting control information and/or allocating resources. As such, at least part of the control plane passes through the network infrastructure. The conditions can include local parameters such as the proximity of the devices, and macro parameters such as overall traffic demand, and location of non-DMC devices. A network-centric arrangement offers potential for offloading local traffic from the network, which is attractive to cellular operators.

With a network-centric approach, and in some scenarios with a UE-centric approach, the DMC UEs generally need to be aware of which time resources (e.g., subframes) are allocated by the communications controller for the DMC group. Non-orthogonal resource allocation, where same resources are allocated to DMC UEs and other UEs, may not be suitable, such as when there are quality of service (QoS) requirements. Further, uncoordinated orthogonal resource allocation of different UE groups in the network can cause significant performance degradation.

Embodiments are provided herein for a system and method to reduce interference between the cellular and DMC links. The term DMC and device-to-device communication (D2D) are used herein interchangeably to refer to communications between a group of UEs that does not include or does not always involve a communications controller or the network in a data communication path between or among the UEs. In a DMC system, multiple communications controllers, such as eNBs, NodeBs, and/or base stations, may exchange resource allocation information for the purpose of managing DMC in their respective cells or more generally, to tune the system performance according to the operators' needs. Since the information is shared between the multiple controllers, the controllers may coordinate among each other (e.g., cooperate) to allocate resources for their DMC UEs. The coordinated resources can improve resource usage, increase spectral efficiency, reduce interference between cells or UEs, and/or optimizes other features of the network.

The resource allocation consists in allocating a plurality of resource blocks (e.g., frequency, time, or both frequency and time slots) for the UEs, for uplink/downlink communications with the network and DMC links between the UEs. In the network-centric DMC coordinated allocation, each of the coordinating controllers may partition its corresponding UEs between DMC UEs for DMC and cellular UEs for cellular communications with the controller/network. The DMC UEs can share bands (of frequencies) allocated for DMC. The bands for DMC may be orthogonal (separate) to other bands allocated for the remaining cellular UEs in the cell or may fully overlap with the band allocated for cellular UEs. Further, the controllers exchange information with respect to their DMC configuration and may use this shared information to coordinate between each other and allocate resources in their cells to improve overall resource usage and communication performance.

Figure 2:
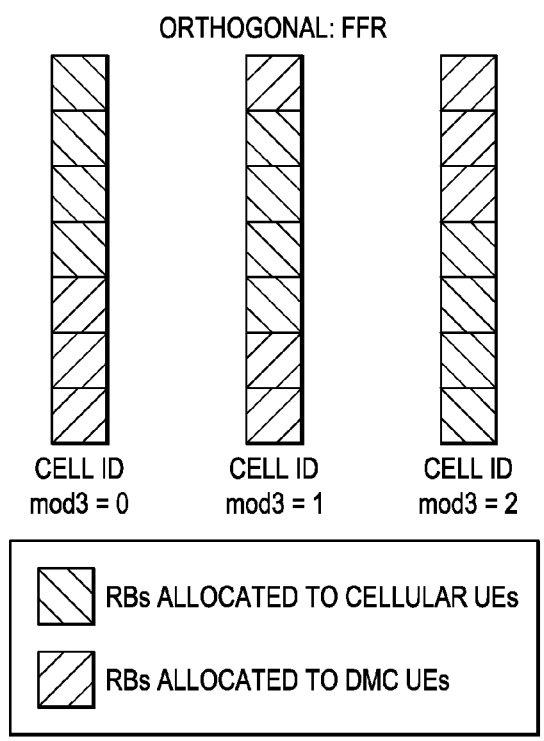
FIG. 2 is a block diagram showing an example of a coordinated orthogonal fractional frequency reuse.

FIG. 2 shows an example of a coordinated orthogonal resource allocation in a network-centric approach. The allocations are shown for three cells. A fractional frequency reuse (FFR) technique is shown in FIG. 2 as an example. However, the FFR technique is not always needed. Specifically, a function of the cell ID or some parameter associated with controller, can be used by the cell coordinator, (e.g., a modulus function) to determine the DMC resource blocks (RBs) in each cell. This can minimize overlap in cellular allocated RBs and DMC allocated RBs between the cells, and hence reduce inter-cell interference. Alternatively, the DMC resource blocks in each cell can be determined based on traffic load in each cell, or other similar metrics.

In an embodiment, information is exchanged between network or cell controllers to coordinate the orthogonal resource allocation for DMC. This exchange can be accomplished via any suitable interface or link between each of two controllers, e.g., a X2 interface (or X2 signaling) as defined by 3GPP in TS36.300 v9.1.0, Section 20. The information may also be transferred wirelessly between the controllers, e.g., over a microwave link. The information can include the percentage of resources allocated to DMC, the number of DMC pairs (UEs) transmitting in the resources allocated for the set of DMC links, either on separate or overlapping resources, indication of the interference generated by DMC UEs, and/or indication (e.g., a one-bit field) of whether the network controller is using its coordinated resources or a predetermined region that all the coordinating controllers can use. The exchange information via the X2 interface can be per each cell or controller.

Figure 3:
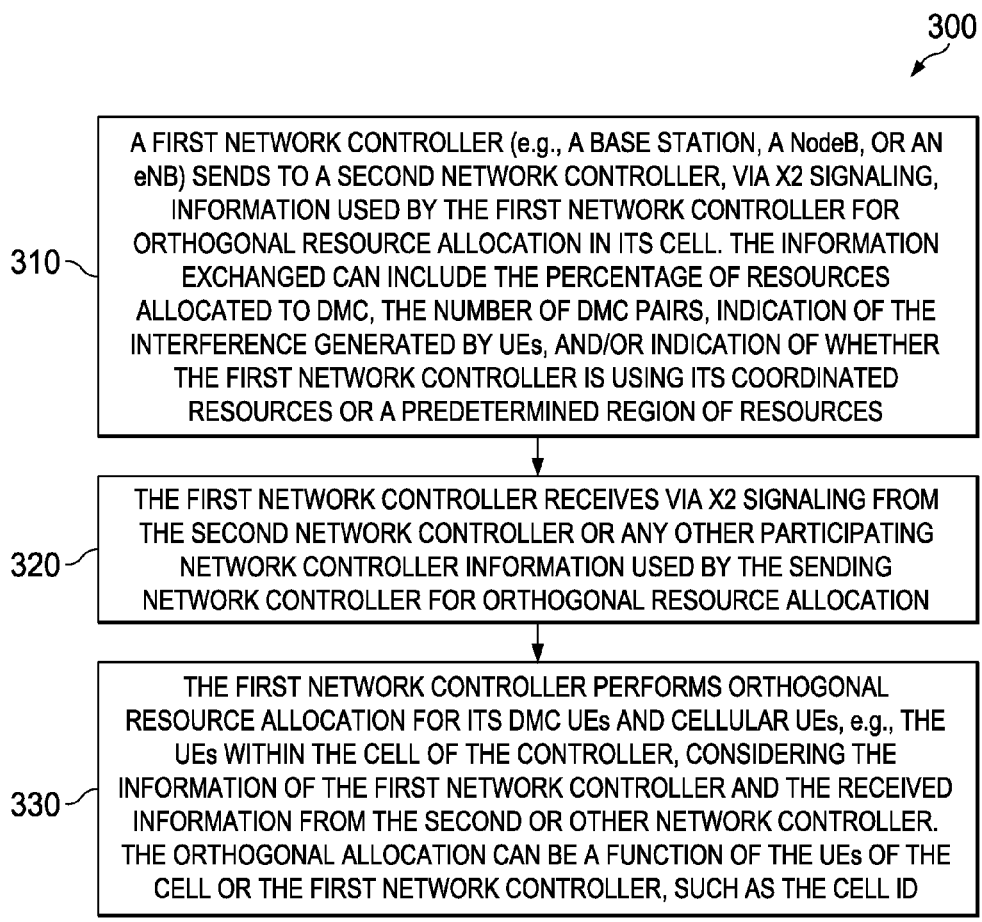
FIG. 3 is a flow chart of an embodiment of a method for coordinated orthogonal resource allocation for DMC users in a network.

FIG. 3 illustrates an embodiment of a method 300 for coordinated orthogonal resource allocation for DMC users in a network. At step 310, a first network controller (e.g., a base station, a NodeB, or an eNB) sends to a second network controller, via X2 signaling, information used by the first network controller for orthogonal resource allocation in its cell. The information exchanged can include the percentage of resources allocated to DMC, the number of DMC pairs (UEs), indication of the interference generated by UEs, and/or indication of whether the first network controller is using its coordinated resources or a predetermined region of resources. At step 320, the first network controller receives via X2 signaling from the second network controller or any other participating network controller information used by the sending network controller for orthogonal resource allocation. At an optional step 340, the first network controller performs orthogonal resource allocation for its DMC UEs and cellular UEs, e.g., the UEs within the cell of the controller, considering the information of the first network controller and the received information from the second or other network controller. The orthogonal allocation can be a function of the number of UEs participating in DMC of the first network controller, and may also include information such as the cell ID or eNB ID. The method 300 can be implemented between any number of participating controllers, where each controller sends its information to the other controllers and receives information from the other controllers.

The method 300 is described for orthogonal resource allocation, but may apply for non-orthogonal resource allocation without substantial changes. The method may apply for UE-centric or network-centric DMC. The method may also apply with any suitable interface or link between controllers or eNBs other than X2. For instance, the information may be carried deeper in the network from one eNB to a proximity server, and then conveyed from the proximity server to the second eNB. Note also that the parameters exchanged in step 310 are only given as examples, and additional parameters relevant to the DMC may be exchanged in a similar fashion. In another embodiment, the coordination can be done implicitly a priori. For example, each node is configured with a region of resources that it may assign from, via a network operation management (OA&M) node.

In another embodiment method for coordinated orthogonal resource allocation for DMC users, a first controller performs its orthogonal resource allocation for DMC and cellular UEs and sends this information (including the allocated resource blocks) to a second participating controller. In turn, the second controller performs its orthogonal resource allocation according to the information, and sends the results (indicating the allocated resource blocks) to another participating controller if available. In yet another embodiment, the participating controllers exchange the information first and then coordinate the orthogonal allocations between each other by jointly allocating resource blocks for all the UEs at all the cells, for instance to ensure that the DMC UEs in each cell obtain a set of resource blocks with minimum overlap with other cells (e.g., as shown in FIG. 2). Alternatively, the two eNBs may decide to set up a zone where their DMC regions overlap in order to ensure seamless transition for the DMC UEs from a first eNB to a second eNB.

Figure 4:
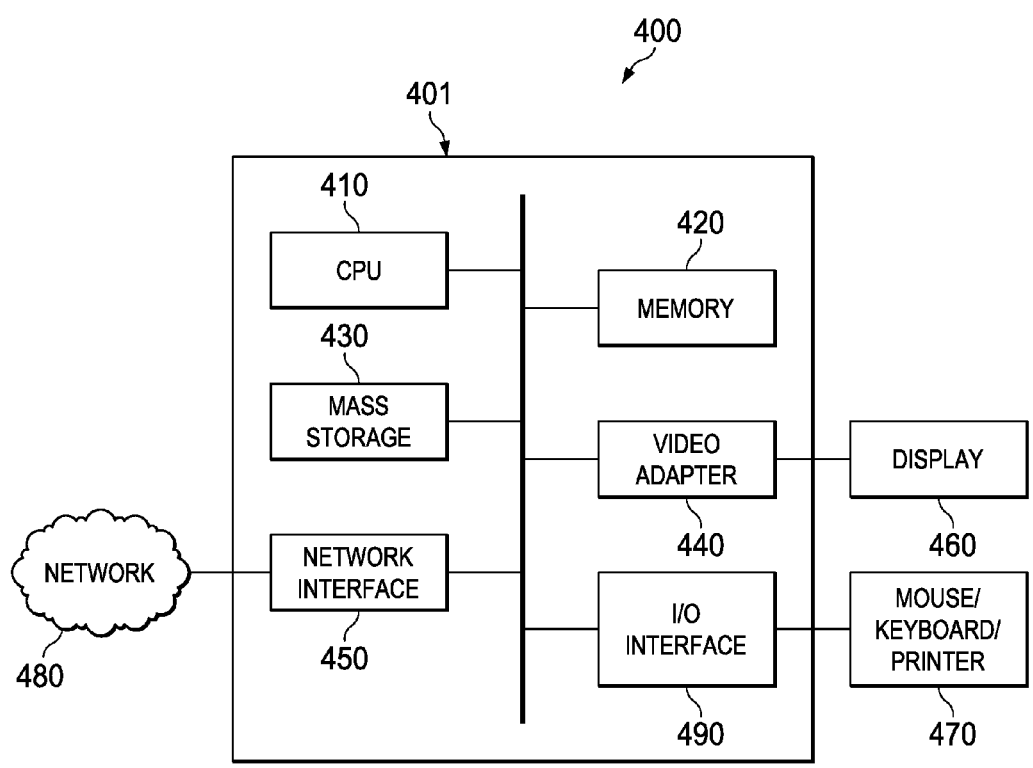
FIG. 4 is a block diagram of a mobile communications device that can be used to implement various embodiments.

FIG. 4 is a block diagram of a processing system 400 that may be used for implementing the devices and methods disclosed herein, such as a UE, a macro NodeB, or a LPN. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, memory 420, a mass storage device 430, a video adapter 440, and an I/O interface 490 connected to a bus.

The bus may be one or more of any type of several bus architectures including a memory bus or memory controller, a peripheral bus, video bus, or the like. The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs.

The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 490 provide interfaces to couple external input and output devices to the processing unit 401. As illustrated, examples of input and output devices include a display 460 coupled to the video adapter 440 and a combination of mouse/keyboard/printer 470 coupled to the I/O interface 490. Other devices may be coupled to the processing unit 401, and additional or fewer interface cards may be utilized. For example, a serial interface such as Universal Serial Bus (USB) (not shown) may be used to provide an interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for allocating resources in a network comprising:
   sending, by a network controller, to a second network controller, first information of resources for a first set of direct mobile communication (DMC) links between DMC user equipments (UEs), the first set of DMC links associated with the network controller; and
   receiving, by the network controller, second information of resources for a second set of DMC links associated with the second network controller, the second information of resources being determined in accordance with the first information of resources, the resources described by the second information of resources being coordinated by the second network controller with respect to the network controller to be orthogonal to the resources described by the first information of resources.

2. The method of claim 1 further comprising coordinating, with the second network controller, allocation of network resources for the first set of DMC links between the DMC UEs, wherein the network resources comprise cellular and DMC resources.

3. The method of claim 1 further comprising signaling the first information of resources and the second information of resources explicitly.

4. The method of claim 3, wherein the signaling is exchanged over one of a X2 interface, a wireless link, and a microwave link.

5. The method of claim 1, wherein the first information of resources includes at least one of a percentage of network resources allocated to DMC and resource blocks (RBs) reserved for DMC.

6. The method of claim 1, wherein the first information of resources includes a number of DMC UEs transmitting using overlapping resources.

7. The method of claim 1 further comprising estimating interference generated by at least a subset of the DMC UEs, and wherein the first information of resources includes an indication of the interference generated by at least the subset of the DMC UEs.

8. The method of claim 1, wherein the first information of resources includes an indication of whether the network controller is using coordinated network resources or predetermined network resources for a plurality of coordinating network controllers including the network controller and the second network controller.

9. The method of claim 1 further comprising determining network resources for the DMC UEs according to one of a function, configuration or parameters of the network controller, and wherein the function comprises a cell identifier (ID) associated with the network controller.

10. The method of claim 1, wherein the network controller is one of a network controller, a nodeB, an evolved nodeB, a base station, and a relay.

11. A method for allocating resources for direct mobile communication (DMC) in a network, the method comprising:
   allocating, by a network component, first orthogonal network resources for DMC user equipments (UEs) and cellular UEs associated with the network component, wherein the allocation includes determining the first orthogonal network resources for the DMC UEs according to a parameter associated with the network component;
   sending, by the network component, to a second network component, information about the DMC UEs and the first orthogonal network resources; and
   receiving, by the network component, from the second network component, information about second orthogonal network resources for DMC UEs and cellular UEs, the second orthogonal network resources being coordinated by the second network component with respect to the network component to be orthogonal to the first orthogonal network resources.

12. The method of claim 11, wherein the first orthogonal network resources comprise resource blocks allocated for the DMC UEs in the cell, and other resource blocks allocated for the cellular UEs in the cell.

13. The method of claim 12, wherein the resource blocks allocated for the DMC UEs comprise at least a resource block unassigned for second DMC UEs in a second cell associated with the second network component, and wherein the other resource blocks allocated for the cellular UEs in the cell comprise at least a resource block unassigned for second cellular UEs in the second cell.

14. The method of claim 13, wherein the second DMC UEs in the second cell are allocated second resource blocks according to a second ID of the second cell.

15. The method of claim 11, wherein the information about the DMC UEs and the first orthogonal network resources includes at least one of a percentage of first orthogonal network resources allocated to DMC, a number of DMC UEs transmitting using overlapping resources, an indication of interference generated by the DMC UEs, and an indication of whether the network component is using coordinated first orthogonal network resources or predetermined first orthogonal network resources for a plurality of coordinating network components including the network component and the second network component.

16. A network controller device comprising:
   at least one processor; and
   a non-transitory computer readable storage medium storing programming for execution by the at least one processor, the programming including instructions to:
      send, to a second network controller, first information of resources for a first set of direct mobile communication (DMC) links between DMC user equipments (UEs), the first set of DMC links associated with the network controller; and
      receive second information of resources for a second set of DMC links associated with the second network controller, the second information of resources being determined in accordance with the first information of resources, the resources described by the second information of resources being coordinated by the second network controller with respect to the network controller device to be orthogonal to the resources described by the first information of resources.

17. The network controller of claim 16, wherein the first information of resources includes at least one of a percentage of network resources allocated to DMC, resource blocks (RBs) reserved for DMC, a number of DMC UEs transmitting using overlapping resources, an indication of interference generated by the DMC UEs, and an indication of whether the network controller is using coordinated network resources or predetermined network resources for a plurality of coordinating network controllers including the network controller and the second network controller.

18. The network controller of claim 16, wherein the programming includes further instructions to determine network resources for the DMC UEs according to a configuration of the network controller.

19. The network controller of claim 18, wherein the instructions to determine the network resources for the DMC UEs include further instructions to select resource blocks to allocate for the DMC UEs in accordance with a modulus of a cell identifier (ID) associated with the network controller.

20. The network controller of claim 16, wherein the network controller is one of a network controller, a nodeB, an evolved nodeB, and a base station.

\* \* \* \* \*